Patented Dec. 25, 1928.

1,696,490

UNITED STATES PATENT OFFICE.

PAUL KNAPP, OF WOODBURY, NEW JERSEY.

RESINOUS MATERIAL AND PROCESS OF MAKING SAME.

No Drawing. Application filed May 18, 1921, Serial No. 470,675. Renewed February 18, 1926.

My invention relates to novel resinous materials, as hereinafter described and to methods of making such materials in a simple and advantageous manner, by treating a very dilute aqueous solution of furfuraldehyde obtained as herein described, with an amine in the presence of an acid or other condensing agent.

In the preparation of furfuraldehyde by the recently developed distillation of substances containing pentoses or pentosans, such as straw, sawdust or corn cobs, with dilute mineral acids, the furfuraldehyde is obtained in the distillate mixed with a very great quantity of water. The distillate contains only a small percentage, (usually less than two percent) of furfuraldehyde, and its concentration by repeated careful fractionation of the distillate to yield a substantially pure furfuraldehyde is a tedious, time consuming operation in which large amounts of steam are necessary.

Processes have been devised for producing resinous condensation products from concentrated furfural. In such processes an aromatic amine can be dissolved in an acid, say concentrated hydrochloric or acetic, and the solution added to the furfural and the mixture heated to accelerate the condensation. Resins so produced would be useful in the arts, for example, for the production of varnishes and for use as binders in plastic materials, if they could be produced at a sufficiently low cost.

I have found that I can avoid the expensive and troublesome separation of furfuraldehyde from the aqueous distillate containing the same, and obtain a resinous material directly from the aqueous distillate. I have found that I can take the original dilute aqueous distillate from the acid distillation of substances containing pentoses or pentosans, and add to it an amine dissolved in acid, and directly obtain a resinous product.

In some operations, solutions of furfural are produced which contain even smaller percentages of furfural than the solutions produced in the acid distillation of corn cobs and like material. The process of the present invention is equally applicable to such very dilute solutions, containing only a small fraction of a per cent of furfural.

Either aromatic or aliphatic amines can be used in this reaction, either mineral acids, organic acids or other condensing agents also being suitable, and the mixture preferably is heated somewhat to accelerate the condensing action, although this latter is not entirely necessary. As examples of the aromatic amines, I may mention anilin, o-toluidine, p-toluidine, and alpha or beta naphthylamin. With these may be used a suitable acid, such as acetic, hydrochloric, oxalic, etc., or other suitable condensing agents.

I have found that I can quantitively precipitate out the furfuraldehyde in the form of a desirable resinous compound, without going through the intermediate concentration operation, and the large volume of water is readily drained away from the precipitated resinous material which latter settles to the bottom of the receptacle, being insoluble in water.

The properties of the resinous product will, to some extent, depend upon the particular aromatic amine employed. That from anilin and furfural is of a reddish color, melting at about 150° C. This melting point, however, depends to some extent on the proportions of aniline, furfural and acid used. In general, about equimolecular proportions of the amine and furfural can be employed.

The following examples will serve to illustrate further the nature of my invention, which however, is not in any way restricted to the details of these examples.

*Example 1.*—A dilute aqueous solution of furfuraldehyde as obtained by the acid distillation of corn cobs, or the like, and containing about 1% to 2% of furfural, is heated to about 60° C. and a solution of aniline in acetic acid added slowly until a test portion taken out of the mixture shows the furfuraldehyde to be completely precipitated as the resionus material which comes out as a sticky mass. The large volume of water is decanted off, whereupon the sticky mass hardens, and is obtained in the form of a resin. I then use this resin for any purpose I may desire.

The resinous material produced in the above example is insoluble in water, but readily soluble in many organic solvents such as carbon tetrachloride, benzol, naphtha or furfural. The solution can be used as a wood stain or varnish. It is an exceedingly useful material.

*Example 2.*—To a crude distillate containing about 1% to 2% or so of furfural, is added an acid such as hydrochloric, to bring the acidity up to about 1% HCl, then ortho-toluidine is added in amount about chemically equivalent to furfural present. The mixture is heated with agitation, up to about 50° C. to 70° C., whereupon the resin product is precipitated and separated as in Example 1.

*Example 3.*—The crude furfural distillate as above described is acidified with hydrochloric acid in about the proportions mentioned in Example 2, the mixture heated to about 60 to 70° C., and methylamin added as long as a precipitation is produced thereby. As shown by taking out a test sample, the precipitate is a light colored, viscous, sticky resin, very suitable for making a varnish or enamel composition, particularly for use on light colored work. This product could also be used as a binder in the manufacture of plastics.

*Example 4.*—The crude resin produced in Example 1 is, as separated from the warm aqueous liquid, a very sticky soft plastic body of about the consistency of thick molasses, and of a reddish-brown color. On cooling it hardens a little. When dried, as in a drying oven, it becomes more or less brittle. It can then be ground in a mill and may be put into a mold, together with a filler material such as asbestos, powdered stone, wood meal or sawdust, and heated and pressed simultaneously to produce a molded plastic. This procedure could be followed for making various ornamental articles, picture moldings, canes, table tops, and various other useful or ornamental objects. The powdered material could also be used for making a varnish, by being dissolved in an appropriate solvent, i. e., benzol, carbon tetrachlorid, naphtha, gasoline or furfural, or other appropriate simple or mixed solvent. This resin melts at about 150° C.

*Example 5.*—Another procedure sometimes useful is to effect a further condensation or polymerization of the soft resin by heat treatment. Thus the soft resin, for example, that produced in Example 1, (with or without drying and grinding) may be placed in an autoclave and heated to above its melting point, say to about 180° C., or even higher, say up to 220° C., under pressure. The heating may be continued for a considerable time, say two to five hours, under pressure. This darkens the product to nearly a black color and considerably modifies its solubility. If heated for two hours or more at 180° C., it would solidify during the heating operation and become substantially insoluble in benzol, but would retain its solubility in furfuraldehyde. This product could be used in making a varnish, or could be used as a binder in the plastic art, as above referred to. It is considerably harder than the brittle material in Example 4, and after high heating would become substantially infusible, except at very high temperatures. If desired, more anilin can be added to the resinous product before this heating operation, or any other amino body could be similarly added, either the same as that used in making the original condensation product or not. The resin thereby produced has a higher adhesive value, (i. e., will bind a greater amount of pulverulent material such as wood flour) but otherwise is not especially different. The hardness, melting point, color and solubilities would be about the same as without such addition.

I wish it to be understood that the process of this invention is simple and advantageous, because by merely adding the acid solution of aniline (say in acetic acid) to the furfuraldehyde solution as obtained by distillation of corn cobs, I am able to simultaneously precipitate out the furfuraldehyde as a condensation product in the form of useful resinous materials.

I have above referred to the use of acids as the condensing agents. However, other condensing agents can be employed among which I may mention calcium chlorid, iron chlorid, zinc chlorid, etc. Ordinarily the cheap and efficient mineral acids are to be recommended. I have referred to heating to about 60° C., to effect condensation. However, while this is preferable, it is not entirely necessary. The materials can be mixed at ordinary room temperature and allowed to stand for a long time, whereupon the reaction will be found to be complete. While the condensation takes place in a few minutes at 60° C., it might require hours or even days in the cold.

The resins produced when the dilute solution of furfural is used, say a solution of about 1% strength or weaker, as produced directly from corn cobs, etc., seem to be somewhat different from those produced from the same reagents when in a concentrated condition. Particularly, those produced in my process seem to have greater adhesive strength. It is possible that the presence of other ingredients in the aqueous distillate may in a measure affect the properties of the resins produced, or the presence of the large amount of water may cause a different chemical reaction to take place.

While I have described my invention above in detail, many changes may be made therein without departing from the spirit of my invention.

I claim:

1. The process which comprises treating in the presence of a condensing agent, a dilute aqueous solution of furfuraldehyde with an amino body and condensing to form a resinous material.

2. The process which comprises treating in the presence of a condensing agent, a dilute aqueous solution of furfuraldehyde of the strength directly obtained by the acid distillation of substances containing pentoses or pentosans, with a solution of an amine and condensing to form a resinous material.

3. The process which comprises treating the distillate obtained in the distillation of substances containing pentoses and pentosans with mineral acids, with an amine in the presence of an acid, to form an insoluble resinous material, and separating such resinous material from the large volume of water in the distillate.

4. The process which comprises treating a dilute aqueous solution of furfural with an amine and a condensing agent, at a temperature of about 60° C., to form a resinous material.

5. A process which comprises heating a dilute aqueous solution containing furfural with an amine and a condensing agent, whereby a resinous body is produced.

6. The process which comprises treating in the presence of a condensing agent, a dilute aqueous solution of furfuraldehyde produced directly from pentose-containing raw materials, with an amino body and condensing to form a resinous material.

In testimony whereof I affix my signature.

PAUL KNAPP.